(12) United States Patent
Karle et al.

(10) Patent No.: US 9,663,950 B2
(45) Date of Patent: May 30, 2017

(54) TEXTILE-REINFORCED CONCRETE COMPONENT

(71) Applicant: GROZ-BECKERT KG, Albstadt (DE)

(72) Inventors: Roland Karle, Bisingen (DE); Hans Kromer, Winterlingen (DE); Johann Pfaff, Winterlingen (DE)

(73) Assignee: GROZ-BECKERT KG, Albstadt (DE)

( * ) Notice: Subject to any disclaimer, the term of this patent is extended or adjusted under 35 U.S.C. 154(b) by 121 days.

(21) Appl. No.: 14/402,769

(22) PCT Filed: May 7, 2013

(86) PCT No.: PCT/EP2013/059498
§ 371 (c)(1),
(2) Date: Nov. 21, 2014

(87) PCT Pub. No.: WO2013/174648
PCT Pub. Date: Nov. 28, 2013

(65) Prior Publication Data
US 2015/0132533 A1    May 14, 2015

(30) Foreign Application Priority Data
May 23, 2012    (EP) .................................... 12169132

(51) Int. Cl.
*E04C 2/06* (2006.01)
*E04C 5/07* (2006.01)
(Continued)

(52) U.S. Cl.
CPC ................ *E04C 2/06* (2013.01); *B29C 70/06* (2013.01); *B29C 70/28* (2013.01); *E04C 5/07* (2013.01);
(Continued)

(58) Field of Classification Search
CPC ........................................................ E04C 2/06
(Continued)

(56) References Cited

U.S. PATENT DOCUMENTS 4,743,472 A    5/1988  Wilkens
4,819,395 A    4/1989  Sugita
(Continued)

FOREIGN PATENT DOCUMENTS

DE        383365 C      10/1923
DE        1925762 A1    1/1970
(Continued)

OTHER PUBLICATIONS

Notice of Opposition in corresponding European Patent No. EP 2666922 B1, dated Apr. 8, 2016, 46 pages.
(Continued)

*Primary Examiner* — Brent O'Hern
(74) *Attorney, Agent, or Firm* — Fitch, Even, Tabin & Flannery LLP

(57) ABSTRACT

A concrete component includes a fiber reinforcement structure (12), formed by a grid arrangement (15). At least some of the rods extending in the X or Y direction are preferably designed as double rods having a joined cross-section or having sub-cross-sections separated from each other by a gap (20). Such double rods can be arranged in a grid structure both at right angles to each other and at other angles to provide a triangular structure, a hexagonal structure, or the like as a grid. Fiber reinforcement structures (12) made of a plastic-impregnated fiber material, such as epoxy-resin-bonded glass fibers having long fibers (endless fibers), in the particular rod longitudinal direction and without bonding among each other (ravings) can construct an adequately load-bearing composite with the concrete body (II). The steel rods can act as reinforcement, wherein harm-
(Continued)

ful effects on the concrete, in particular wedge and gap effects, do not occur.

10 Claims, 4 Drawing Sheets

(51) Int. Cl.
  *B29C 70/06* (2006.01)
  *B29C 70/28* (2006.01)

(52) U.S. Cl.
  CPC .. *Y10T 156/1002* (2015.01); *Y10T 428/24074* (2015.01); *Y10T 428/249932* (2015.04)

(58) Field of Classification Search
  USPC .......................................................... 428/107
  See application file for complete search history.

(56) References Cited

U.S. PATENT DOCUMENTS

| | | | |
|---|---|---|---|
| 5,836,715 | A | 11/1998 | Hendrix et al. |
| 6,263,629 | B1 | 7/2001 | Brown, Jr. |
| 2002/0062619 | A1 | 5/2002 | Houser |
| 2004/0025465 | A1* | 2/2004 | Aldea ................. E04G 23/0218 52/514 |
| 2005/0047863 | A1 | 3/2005 | Scherer |

FOREIGN PATENT DOCUMENTS

| | | | |
|---|---|---|---|
| DE | 2603340 | A1 | 8/1977 |
| DE | 3136026 | A1 | 3/1983 |
| DE | 3437087 | C2 | 12/1986 |
| DE | 256159 | A5 | 4/1988 |
| DE | 8903336 | U1 | 3/1989 |
| DE | 3815246 | A1 | 11/1989 |
| DE | 275008 | A1 | 1/1990 |
| DE | 4135581 | A1 | 5/1993 |
| DE | 3687345 | T2 | 7/1993 |
| DE | 19609492 | A1 | 9/1997 |
| DE | 10126074 | A1 | 1/2003 |
| DE | 10228406 | A1 | 1/2003 |
| DE | 69622736 | T2 | 3/2003 |
| DE | 20207945 | U1 | 9/2003 |
| DE | 60003066 | T2 | 2/2004 |
| DE | 202004008109 | U1 | 8/2004 |
| DE | 60007818 | T2 | 12/2004 |
| DE | 102010022396 | A1 | 12/2011 |
| DE | 102010045428 | A1 | 3/2012 |
| EP | 0411407 | B1 | 3/1994 |
| EP | 0637658 | A1 | 2/1995 |
| EP | 1215022 | A1 | 6/2002 |
| GB | 2209547 | A | 5/1989 |

OTHER PUBLICATIONS prof. Dr. Paolo Ermanni, Composites Technologien, Skript zur ETH-Vorlesung, Aug. 2007, 442 pages.
Manfred Curbach, Regine Ortlepp, Textilbeton in Theorie und Praxis, Tagungsband zum 6. Kolloquium zu textibewehrten Tragwerken, Deutsche Forschungsgemeinschaft, Berlin, Sep. 19/20, 2011, 16 pages.
SFB 528, Textile Bewehrungen zur bautechnischen Verstaerkung und Instandsetzung, Arbeits- und Ergebnisbericht, Technische Universitaet Dresden, Dresden, Dec. 2001, 555 pages.
Manfred Curbach, Frank Jessie, Sonderforschungsbereich 528, Textilebeton Theorie und Praxis, Tagungsband zum 4. Kolloquium zu textilbewehrten Tragwerken (CTRs4) und zur 1. Anwendertagung, Technische Universitaet Dresden, Dresden, Jun. 3-5, 2009, 19 pages.
Frank Schladitz, Manfred Curbach, Juergen Schnell, Torsion bearing behavior of textile-reinforced concrete (TRC) strengthened reinforced concrete components, Disseration vorgeletgt an der Fakultaet Bauingenieurwesen der Technischen Universitaet Dresden sur Erlangung der Wuerde eines Doktors der Ingenieurwissenschaften, Leisnig, Jul. 23, 1977, 320 pages.
Josef Hegger, Manfred Curbach, Zum Tragverhalten von textilbewehrtem Beton. Jun. 3, 2005, 221 pages.
ZiTex-Fourm, Innovatives Bauen mit Textilien und textilbewehrten Werkstoffen, Im Auftrag des Ministerium fuer Wirtschaft und Mittelstand, Technologie und Verkehr des Landes Nordrhein-Westfalen, erstellt von Matrix GmbH Düsseldorf, dated May 1999, 80 pages.
Tudalit Magazine, Tudalit Markenverband, Mar. 16, 2016, 1 page.
Mit Programm und Abstrcts zur 2. Anwendertagung, Tudalit, Leichter bauen-Zukunft formen, www.tudalil.de, Magazine, Oct. 2010, 28 pages.
Tudalit, Leichter bauen-Zukunft formen, www.tudalit.de, Magazine, Jun. 2009, 16 pages.
Tudalit, Leichter bauen-Zukunft formen, www.tudalit.de, Magazine, Sep. 2011, 16 pages.
Mit Programm und Abstrcts zur 2. Anwendertagung, Tudalit, Leichter bauen-Zukunft formen, www.tudalil.de, Magazine, May 2011, 16 pages.
International Search Report for corresponding PCT/EP2013/059498 dated Jul. 22, 2013.

\* cited by examiner

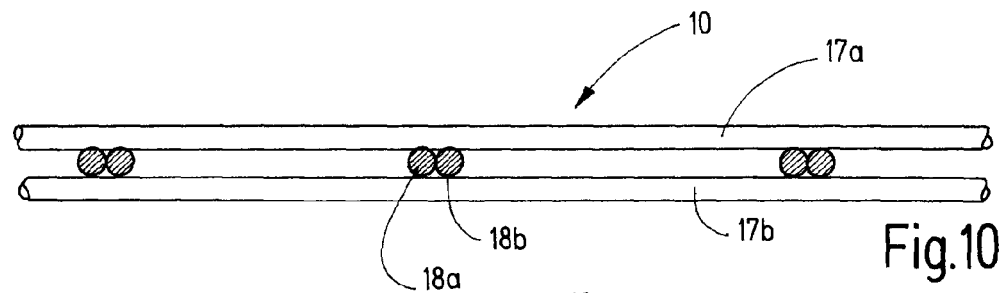
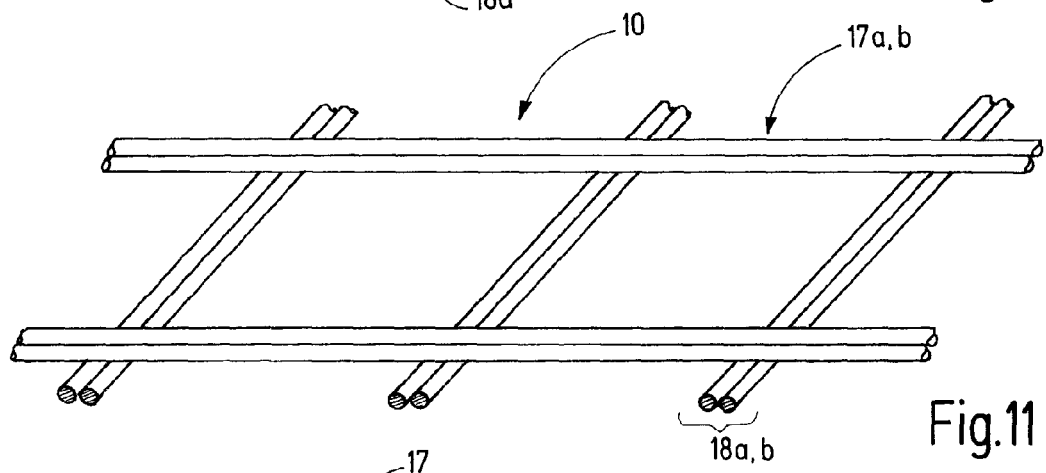
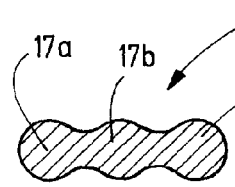 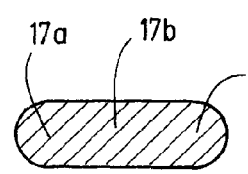
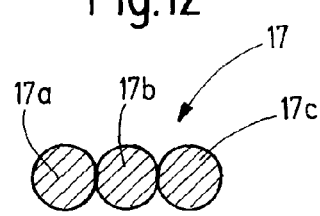 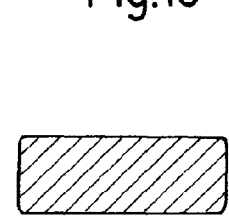
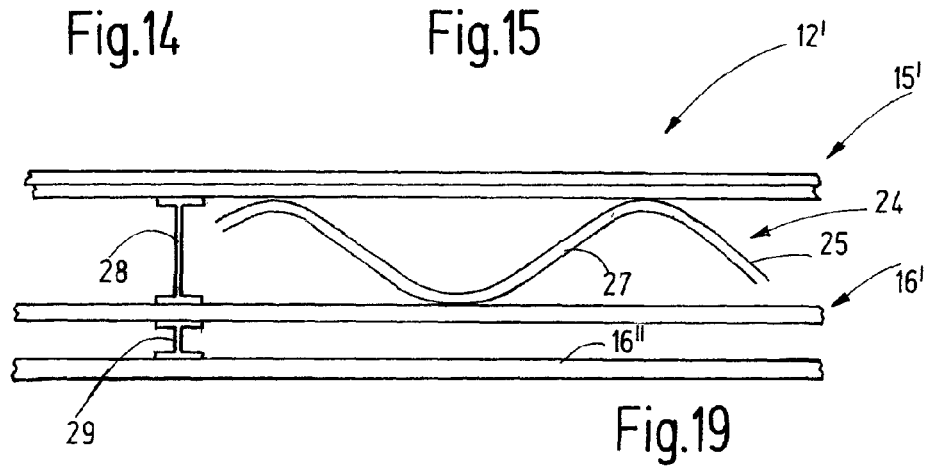

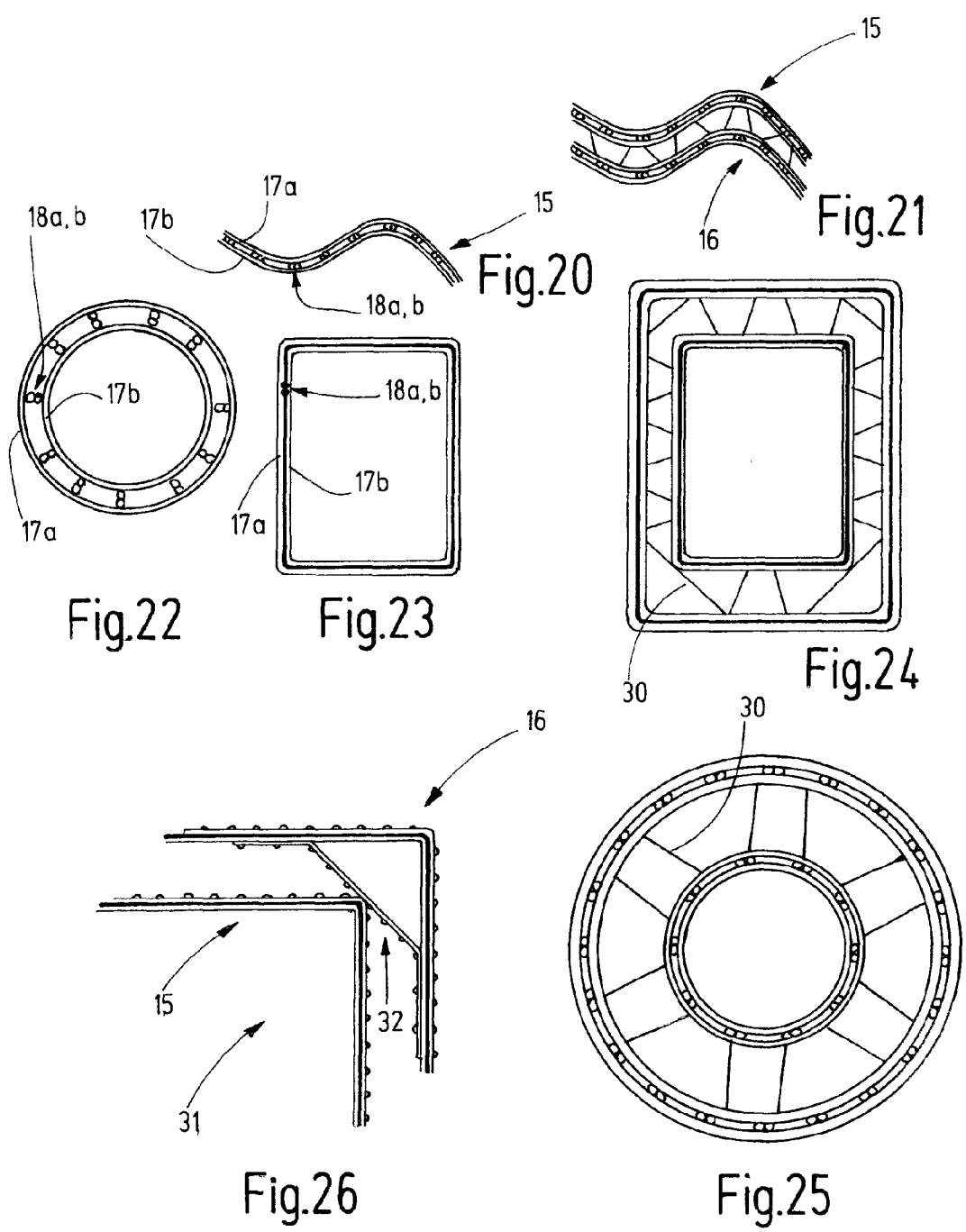

TEXTILE-REINFORCED CONCRETE COMPONENT

CROSS REFERENCE TO RELATED APPLICATIONS

This patent application is the national phase of PCT/EP2013/059498 filed May 7, 2013, which claims the benefit of European Patent Application No. EP 12169132.3 filed May 23, 2012.

TECHNICAL FIELD

The invention relates to a concrete component with a textile-reinforced structure as well as to a method for the production of such a fiber reinforcement structure.

BACKGROUND

In practice, concrete components are provided with reinforcement elements or reinforcing elements to increase the load capacity of the concrete component, particularly with respect to bending and tensile stresses. Traditionally, iron rods or iron grids are used for reinforcement. One example of this is shown in publication DE 8903336 U1. Spaced apart reinforcement rods are connected to each other by wave-shaped reinforcements. For connection of the reinforcement rods and the wave-shaped reinforcements, wire meshes can be provided as they are used in concrete construction for the connection of reinforcement grids, reinforcement rods and the like.

Publication DD 256 159 A5 has already suggested the reinforcement of concrete components with a grid of epoxide resin rods, whereby the epoxide resin rods are reinforced with glass fibers. In so doing, the epoxide resin rods are imparted with a non-round, sickle-shaped or semi-circular cross-section.

Likewise, publication DD 275008 A1 describes the reinforcement of minerally bonded concrete components using non-metallic reinforcing elements. Ropes are used for reinforcement, said ropes being arranged on a net-like planar structure.

Due to their ready availability and high tensile strength glass fibers are obvious as reinforcing elements for concrete components. However, inside a glass fiber strand which comprises a plurality of optical fibers arranged parallel to each other, there occurs only a tensile stress transmission from the exterior surface of the glass fiber strand to the glass fibers that are on the interior of the bundle. In addition, it is found that a splitting effect can originate from the glass fiber strands at certain loads, so that, ultimately, there will be a failure of the structural component.

SUMMARY

Considering this, it is the object of the invention to provide a concrete component comprising a fiber reinforcement structure, said concrete component displaying improved properties.

The concrete component according to the invention comprises a fiber reinforcement structure with fiber strands forming a grid array with first fiber strands oriented in a first direction and second fiber strands oriented in a second direction. The first and the second directions, together, may subtend a right angle, an acute angle or an obtuse angle. Thus the grid may be a rectangular grid, a rhomboid grid, a triangular grid, a hexagonal grid or the like. The rovings may be arranged so as to be elongated or also wave-shaped or have a zigzag form. Preferably, they are arranged in directions in which the tensile forces are acting in the structural component. The first and second fiber strands are connected to each another at the crossing points of the grid. The connection can be provided by binding, gluing, welding, stitching, stapling, sewing or by any other type of connection that is disposed to secure the fiber strands in place regarding their position, at least until the reinforcement grid is placed in a concrete body.

The concrete body contains a filler and a binder. The filler may be a mineral filler and contain, e.g., gravel, stone chips, crushed stone, sand, slag or the like. The binder may be or may contain an organic or, as is preferred, a mineral binder. This includes cement, gypsum, limestone, blast furnace slag, fly ash or the like.

The fiber strands are preferably so-called rovings, wherein glass fibers are arranged non-twisted and oriented essentially parallel to each other in longitudinal direction of the rovings. The fiber strands comprise a plastic portion. This means that the individual glass fibers of the fiber strand, individually or together, are surrounded by a plastic layer which prevents a direct contact between each fiber and the concrete. The plastic portion represents a corrosion protection for the glass fibers. In addition, this plastic portion can act in a force-transmitting manner so as to transmit longitudinal forces from the roving surface to the glass fibers inside and serve as an adhesion promoter. Additional fiber strands are associated with the grid array formed by the first fiber strands and the second fiber strands. These are preferably basically configured just like the first fiber strands and the second fiber strands. They are configured, for example, as glass fiber rovings that, in turn, contain a percentage of a plastic material.

For the first fiber strands, the second fiber strands and the additional fiber strands it applies that not only the preferred glass fibers can be used as fiber material but also other inorganic fibers such as basalt fibers, carbon fibers or the like, and also synthetic fibers such as, for example, aramid fibers. It is also possible to use mixtures of the aforementioned fibers.

The additional fiber strands can be placed parallel and in the closest proximity to the first fiber strands and/or parallel and in the closest proximity to the second fiber strands. The additional fiber strands may be arranged separate from the first and second fiber strands, or also be joined to result in one total cross-section. The total cross-section may be an oval cross-section, a rounded rectangular cross-section or any other cornerless cross-section deviating from the circular cornerless form. Consequently, the additional fiber strands form, with the respective adjacent first or second fiber strand, a double rod or multiple rod pair. For example, if the roving used for all fiber strands is a 3600 tex roving, a double rod of 7200 tex is thus attained. It is found that such a double rod may replace a reinforcing rod made of structural steel. In particular, it is found that the force transmission is good also in the interior of the respective cross-sections of the double rod because of the fibers and that an explosion effect acting on the concrete does not originate from the rod and, in any event, not to a harmful extent. This also applies to multiple rods. Preferably, larger distances (for example, 10 to 50 mm or also, for example, 60 mm to 400 mm) are provided between adjacent double or multiple rods to create a large-mesh reinforcement grid.

The additional fiber strands are connected to the respective first fiber strand or second fiber strand, with which they form a double or multiple rod, preferably in a material-bonded manner, in particular, for example by bonding or fusing. A simple and safe production process presents itself. The connection may exist along the entire length of the fiber strand or only intermittently.

The additional fiber strands, like the first and the second fiber strands, may be formed as straight, linear elements. Alternatively, they may be wave-shaped to create a connection between two or more grid arrays described of the above-described structure. If wave-shaped fiber strands form a spacer, they are preferably wave-shaped without kinks. They follow a minimally curved line. Preferably, its strands reciprocate between two reinforcement planes extending at an acute angle relative to the planes. This angle is preferably smaller than 45°.

The first and second fiber strands can be configured as a laid structure that is connected at the crossing points by the provided plastic portion, e.g., in a material-bonded or also other manner, e.g., by a binding yarn. As needed, it is possible to provide sewing or knitting threads or the like in order to temporarily hold in place the rovings that are preferably used for the formation of the first fiber stands and/or the second fiber strands. It is also possible to bring the first and the second fiber strands into a woven binding, i.e., to move them past each other over and under each other at the crossing points.

It is preferred that the additional fiber strands be arranged parallel to the first fiber strands and/or the second fiber strands in order to support them. In principle, however, the additional fiber strands can also be arranged in other directions, for example, obliquely to the first fiber strands and/or the second fiber strands.

The additional fiber strands are preferably arranged with the first fiber strands and/or the second fiber strands so as to be in intimate contact. In so doing, they may be longitudinally connected continuously or only at certain points or in sections, and leave gaps in other sections. In any event, a large surface area of the thusly formed double, triple or multiple rod is embedded in the concrete body, without having an explosive effect on said concrete body. The cross-section defined in the double rod or multiple rod is combined or divided among the individual cross-sections. Consequently, it defines at least one passage or, alternatively, a waist.

In a preferred embodiment, the fiber reinforcement structure is formed by two grid arrays that are mutually rigidly connected. In so doing, the meshes of the two grid arrays have at least preferably the same configuration and are oriented so as to be in alignment with each other. In particular, this applies when the two grid arrays are connected to each other without an interposed spacer. However, if a spacer is present, it may be advantageous, for example, to set the mesh widths of the two grid structures differently in order to optimize the concrete component with respect to the occurrence of bending stresses The spacer may be a spacer grid which, for example, is configured to match one of the grid arrays (or also both) and has then been converted into a three-dimensional form. For example, the three-dimensional form may be a wave-form.

In the case of all fiber strands it applies that these are preferably formed by plastic-reinforced rovings which display no appreciable tack at room temperature and ambient temperature and can thus be handled without special precautions. Preferably, the plastic portion is represented by a plastic such as, e.g., a thermally activated epoxide resin, which becomes plastic when heated to 75° C. to 80° C. and can be converted into a duroplastic form by crosslinking. Heating to higher temperatures (for example up to 150° C.) results in faster curing. These are the so-called prepregs (pre-impregnated materials). If there are fiber strands in the form of such prepregs and if a spacer grid is produced of such fiber strands, the latter initially displays sufficient rigidity to have an additional similar or equal grid superimposed. By heating them together, the plastic portion will plasticize. The grid arrays are fused and cure in fused state.

It is also possible to make the spacer from such a not yet fully hardened grid array. To do so, the preformed grid array is placed in a mold, for example comprising rod grids that are movable relative to each other, and converted into the desired shape under thermal action. At the same time, thermally activated grid arrays are placed on both sides of the wave-shaped arrangement in order to fuse with this array and form the three-dimensional reinforcement structure.

Independently of each another, the aforementioned individual features and advantages can be combined with the subject matters of Claim 1 and/or Claim 12. Each implies specific advantages that can also be cumulatively implemented, individually or in groups, on one and the same product. The description hereinafter gives a few examples and references for the possible embodiment of the invention, without restricting the scope already defined by the claims. The expert knowledge of the average person skilled in the art is implied and shall be used as basis in the review of the description and the drawings. They show in

BRIEF DESCRIPTION OF THE DRAWINGS

FIG. 10 an alternative fiber reinforcement structure with double rod, in a sectioned side view;

FIG. 11 a further alternative fiber reinforcement structure with double rods, in a perspective view;

FIGS. 12 to 15 various exemplary cross-sectional forms of double rod or multiple rod structures;

FIG. 19 a three-dimensional reinforcement structure in fragmentary schematic perspective view;

FIGS. 20 and 21 three-dimensional reinforcement structures with double reinforcement rods;

FIGS. 22 to 25 spatially closed reinforcement structures; and

FIG. 26 an angle reinforcement structure, in a schematic representation.

DETAILED DESCRIPTION

Figure 1:
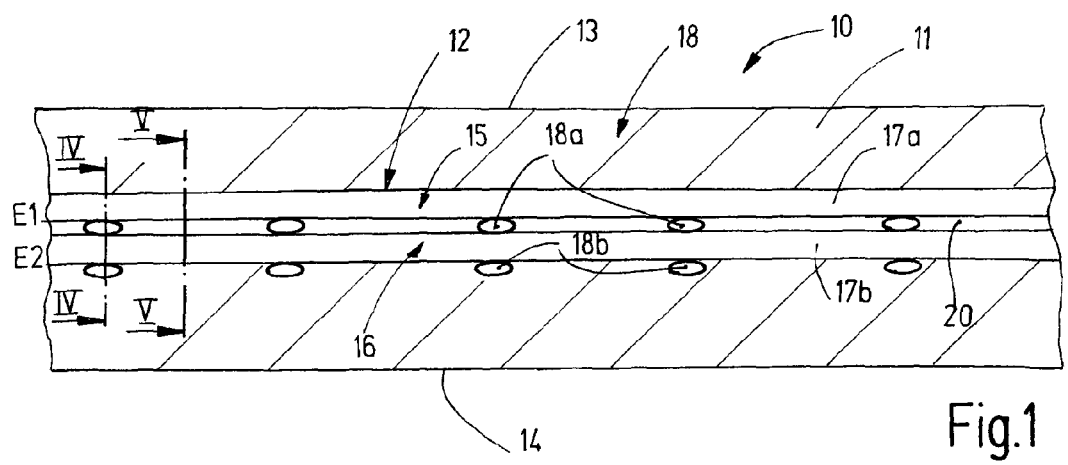
FIG. 1 a concrete component, in a sectional fragmentary schematic with a fiber reinforcement structure.

Depending on the form of reinforcement, the concrete component can be configured as a planar or three-dimensional concrete component. Hereinafter, the invention will be explained with reference to a planar concrete component 10. However, it is pointed out that the details explained below may also be applied to three-dimensional concrete components, provided said details have not been explicitly precluded The concrete component 10 according to FIG. 1 comprises a concrete body 11 in which is embedded a fiber reinforcement structure 12. For example, this is arranged centrally between two exterior faces 13, 14 of the concrete body 11, for example. The fiber reinforcement structure 12 follows the form of the exterior faces 13, 14 and, if these are planar, it is also planar. On both sides of the fiber reinforcement structure 12 there is a concrete cover having a thickness of preferably more than 10 mm, for example 30 mm. The concrete body 11 consists of a mineral concrete, preferably of a cement-bound gravel. The particle size can be 4 mm to 16 mm, for example. This fiber reinforcement structure 12 forms a grid array 15 (similar to FIG. 1, with a mesh width that preferably corresponds to a multiple of the particle size of the concrete). In the present exemplary embodiment, the mesh width may be 25 mm, for example.

In the present exemplary embodiment, the fiber reinforcement structure 12 comprises an upper grid array 15 and a lower grid array 16. These are provided with congruent meshes and connected to each other in a material-bonded manner. Preferably, all the grid arrays 15, 16 are structured in the same manner. Consequently, the description of the grid array 15 hereinafter is analogous to that of the grid array 16.

The grid array 15 comprises first fiber strands 17*a* and second fiber strands 18*a*. The first fiber strands 17*a* define a first direction (x-direction). The second fiber strands 18*a* are arranged transversely thereto, for example at an acute angle or at a right angle, in a second direction (y-direction). The first fiber strands 17 are preferably arranged so as to be equidistant from each other. The second fiber strands 18*a* are also preferably arranged at fixed uniform intervals from each other. The resultant meshes are preferably tetragonal, for example rectangular or square. According to the above rules, however, it is also possible to produce triangular grids or similar grid arrays (rhomboid arrangement and the like).

The first fiber strands 17*a* and the second fiber strands 18*a* are preferably formed as rovings of 1200 tex, 2400 tex or preferably 3600 tex. They each comprise a large number of glass filaments of alkali-resistant glass. The glass fibers of the rovings are impregnated with plastic which is preferably thermally curable. The first non-interwoven fiber strands 17*a* and second fiber strands 18*a* initially form a laid grid structure, wherein the plastic material present due to the impregnation with plastic material—as a result of its adhesive effect—forms a bond at the crossing points.

The number of glass fibers in the rovings for the first fiber strands 17 may correspond to the number of glass fibers in the rovings of the second fiber strands, or may be different therefrom. In this way, the tensile strength of the fiber reinforcement structure 12 can be respectively set and adjusted in the x-direction and in the y-direction for the intended purpose.

The description of the grid assembly 15 hereinabove applies to the grid assembly 16 with the difference that, instead of reference sign "a", the reference sign "b" is used.

Figure 4:
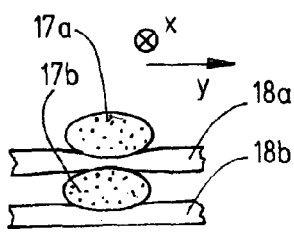
FIGS. 4 to 9 various cross-sections of the fiber reinforcement structures as in FIGS. 1 to 3.

The fiber reinforcement structure 12 consists of both grid arrays 15, 16, which initially have been separately provided, wherein the plastic material of the second fiber strands 18*a*, 18*b* and/or the first fiber strands 17*a*, 17*b* is at least not yet fully crosslinked and has remained thermally activatable. The in so far semi-finished prepared grid arrays 15, 16 are superimposed in this state and aligned with aligned meshes. Through previous or now occurring thermal treatment, the plastic impregnation will now plasticize and thus become tacky, on the one hand, and the crosslinking process will be initiated, other hand. The result is the large-mesh duroplastic fiber reinforcement structure 12 having the cross-sections of FIG. 4 and FIG. 5. The position of the cross-sections is illustrated by section lines IV and V-V, respectively, in FIG. 1. As can be inferred from FIG. 4 (section IV-IV), the crossing points of the second fiber strands 18(*a, b*) and of the first fiber strands 17(*a, b*) are superimposed at a right angle with respect to the x-y plane. At the grid points, a bonding of the grid array 15, 16 occurs. Outside the grid points, the first fiber strands 17*a* according to FIG. 5 have an overall rounded cross-section. Between the two associated first fiber strands 17*a*, 17*b* that form, as it were, a double rod 19 in the fiber-reinforcing structure 12, there is a small gap 20 which can be filled by the fine fraction of the concrete. Such a gap may have a width of, for example, less than one or a few millimeters. In any event, it is smaller than the distance between the various double rods 19.

For the production of the concrete component 10, the provided fiber reinforcement structure 12 that has been provided as described hereinabove is placed and positioned in the workable concrete. Due to its stiffness, it may be incorporated and remain in the concrete like a construction steel mat. Because of the necessary low concrete cover, relatively lightweight, very rigid, highly stressable and corrosion-proof concrete components can be provided. In addition, molded parts can be produced. For example, the reinforcement structure can be placed in a desired mold and be adapted—in a plastic or elastic manner (for example, by thermal energy)—before the concrete is poured into the mold.

Figure 2:
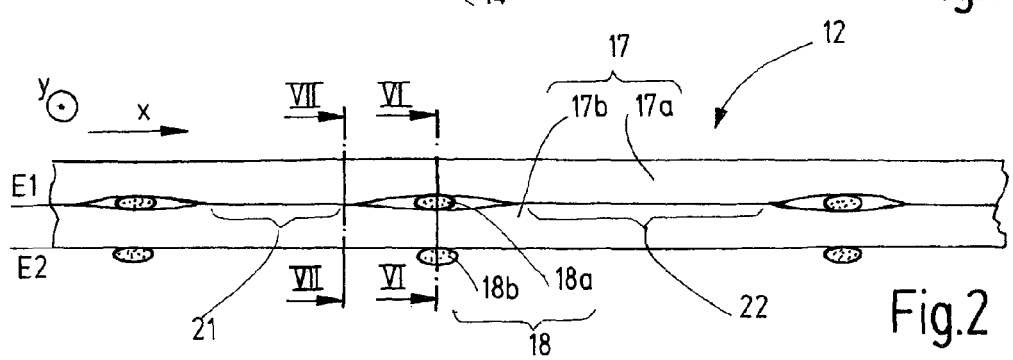
FIGS. 2 and 3 alternative fiber reinforcement structures for the concrete component as in FIG. 1.
Figure 6:
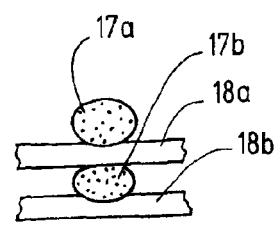
Figure 7:
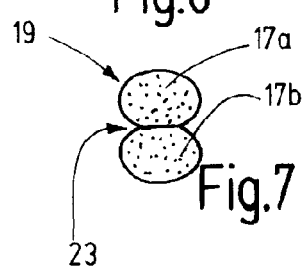

Considering the exemplary embodiment described hereinabove, numerous modifications are possible. In particular, these relate mainly to the fiber reinforcement structure 12. FIG. 2 shows a first modification. While, according to FIGS. 1 and 5, the first fiber strands 17*a*, 17*b* may define a gap 20 between them, it is also possible for the first fiber strands 17 to adhere together along the entire length or, as shown in FIG. 2, along partial lengths 21, 22. FIGS. 6 and 7 show the associate cross-sectional structures. Instead of the gap 20, a waist 23 also exists at least in some places. However, the resultant double rod 19 has a clearly larger surface area than a single rod having the same number of glass filaments, thus improving its load capacity. load-bearing capacity is improved.

Figure 18:
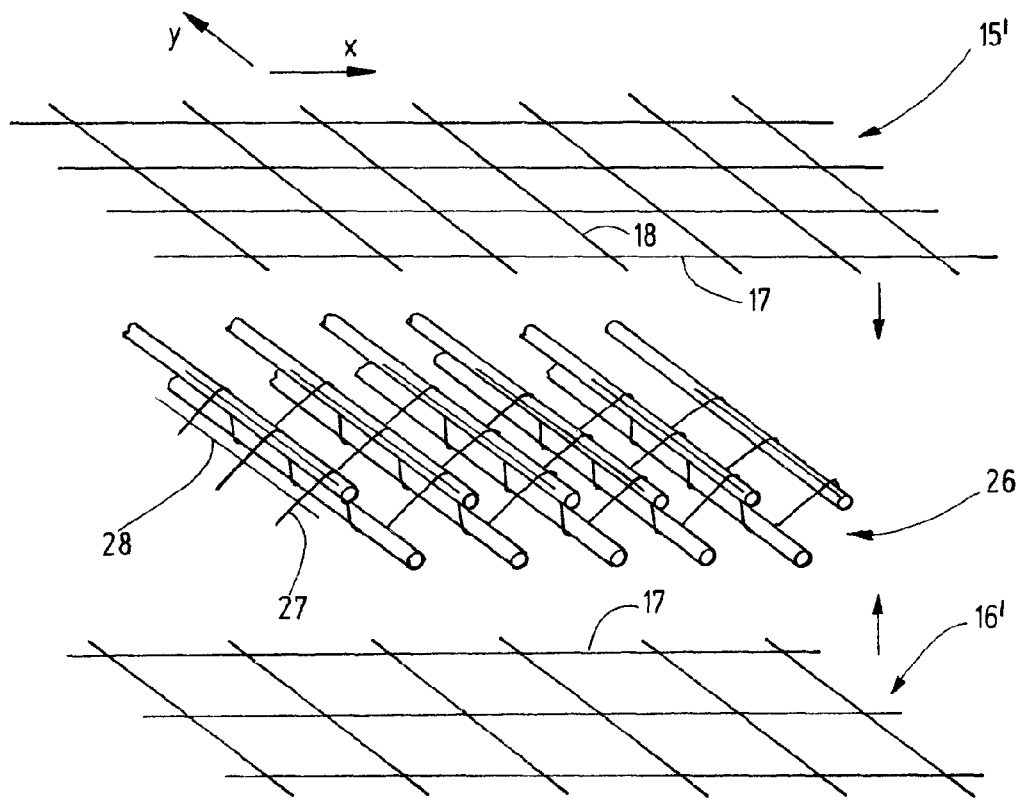
FIG. 18 a method for the production of the three-dimensional reinforcement structure, in a schematic representation.

It is pointed out that, referring to the exemplary embodiment as in FIG. 18, in modification of the shown exemplary embodiment, the two fiber strands 18*a*, 18*b*, may also both be placed in the center plane between the first fiber strands 17. There, they may be arranged on top of each other or also next to each other. The latter would result in the first fiber strands 17*a*, 17*b* to have the configuration of a standing figure "8". While the interposed second fiber strands 18*a*, 18*b* form a lying figure "8". If the second fiber strands 17*a*, 17*b* are thus at a slight distance from each other, they can also define a gap between them.

Figure 3:
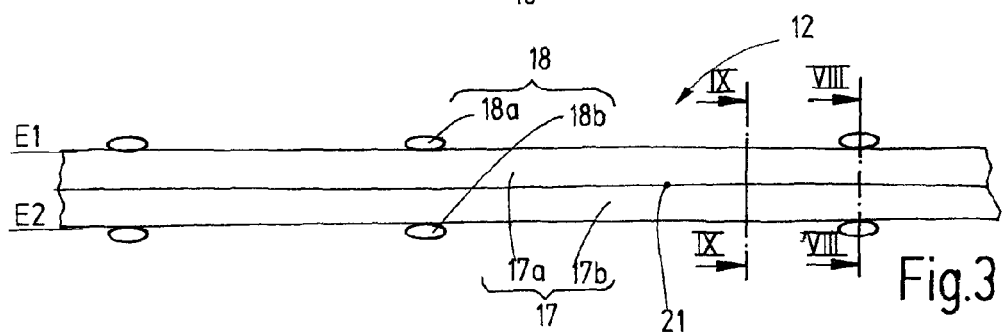
Figure 8:
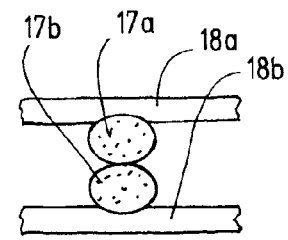

FIG. 3 illustrates another embodiment of the fiber reinforcement structure 12. It differs from the above fiber reinforcement structures by the arrangement of the second fiber strands 18*a*, 18*b*, which are arranged here on the upper side and the underside of the fiber reinforcement structure 12. This results in the cross-sections shown in FIGS. 8 and 9. Other than that, reference is made to the description hereinabove, said description applying analogously. In particular, the first fiber strands 17*a*, 17*b* may be connected to each other along their entire length. It is also possible to connect individual unconnected portions. The double rod 19 here has still only a minimal waist 23. Due to being rounded on its upper and lower sides, however, it does not generate an explosive action on the concrete body, which is different in the case of rovings having a lancet-shaped or sickle-shaped cross-section.

FIG. 10 and FIG. 11 show additional fiber reinforcement structures 12. The figures illustrate further possibilities for the arrangement or formation of double rod arrays. FIG. 10 shows the first fiber strands 17a, 17b configured as single rods, whereas the second fiber strands 18a, 18b, as shown, lie close enough next to each other so as to form a double rod. They may be arranged next to each other forming a minimal gap or they may be arranged so as to merge. FIG. 11 shows an exemplary embodiment, wherein both the first fiber strands 17(a, b) and the second fiber strands 18(a, b) are configured as double or multiple rods. Considering the cross-sections of the double or multiple rods, reference is made to FIGS. 12 to 15 in conjunction with all of the embodiments that have been described hereinabove and that will be described hereinafter. The figures illustrate this by using the example of the first fiber strands 17, in which case this applies equally to the second fiber strands 18. According to FIG. 12, each first fiber strand 17 can be formed by several first fiber strands 17a, 17b, 17c, each being approximately circular, in which case said fiber strands merge in such a manner that the cross-section—in view of FIG. 12—has, as can be seen on the left, rounded, arcuate narrow sides with wave-shaped flanks. As shown by FIG. 13, said flanks may also be substantially straight. FIG. 14 shows that the individual cross-sections of the individual fiber strands 17a, 17b, 17c may also be separated from each other by a minimal gap (that may also have a width of zero).

Based on the cross-section as in FIG. 13, the fiber strand 17 may be approximated to a rectangular cross-section, this cross-section also avoiding any sharp corners but rather having rounded corners. In any event, even if the radius of curvature is small, wedge effects of the cross-section are avoided in that no corner angles smaller than 90° do exist.

Based on the embodiments described hereinabove, it is also possible to make fiber reinforcement structures that comprise more than two grid arrays. The not yet cured but stiff individual grid arrays are then arranged in the appropriate number so as to be superimposed and are bonded together, for example, by thermal action, and are ultimately cured. It is pointed out that in all the embodiments described hereinabove and hereinafter, other material-bonding processes can be employed, for example the spray-deposition of adhesive emulsions and the like.

Figure 16:
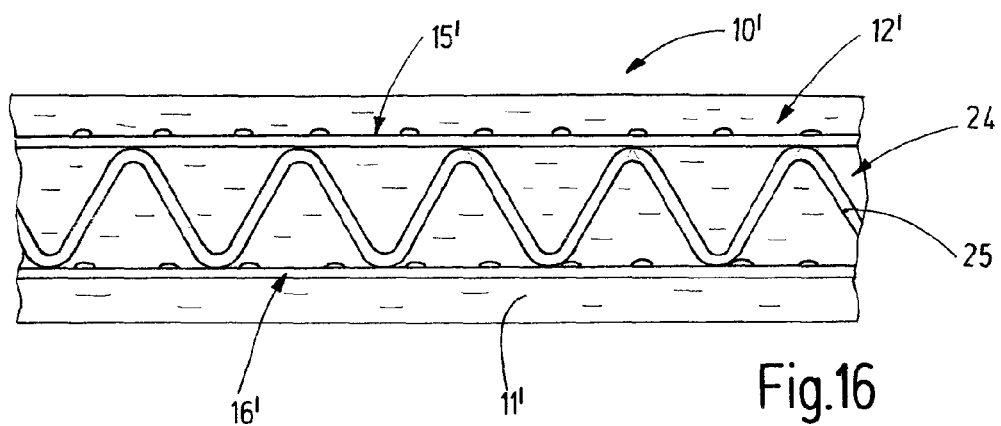
FIG. 16 a concrete component having a three-dimensional fiber reinforcement structure, in a fragmentary cross-sectional view.

The embodiments of the fiber reinforcement structure 12 described above are flat reinforcement structures that, preferably, are planar or may also have other forms, for example, be angled, cup-shaped, spherically curved or have multiple curves. Such reinforcement structures are understood to be two-dimensional, because they are derived from a surface area structure. In contrast, FIG. 16 shows a concrete component 10' having a three-dimensional fiber reinforcement structure 12'. The latter, in turn, comprises two grid arrays 15', 16' that, as depicted, may be configured as a single grid or as a double grid, or as a multiple grid according to one of the previously described embodiments of the fiber reinforcement structures 12. For simpler illustration, FIGS. 10 to 12 show them only as single grid structures. However, double grid or multiple grid structures are preferred due to the greater attainable overall cross-sections of the respective double rods 19.

Regarding the first fiber strands 17(a, b), 18(a, b), their configuration, arrangement and processing, reference is made to the description hereinabove. Hereinafter, reference without the use of reference signs will be made to single strands as well as to double fiber strands 17, 18.

Figure 17:
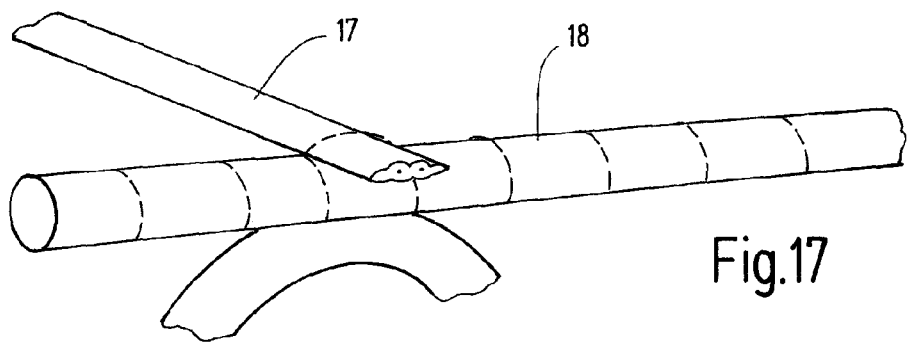
FIG. 17 the three-dimensional reinforcement structure of the concrete component as in FIG. 16, in fragmentary schematic perspective view.

As can be inferred from FIGS. 16 and 17, a spacer array 24 is provided between the grid arrays 15', 16'. This spacer array is formed by a grid array 25 that may have a waveform, for example. For example, The grid array 25 may be made of a flat grid array similar to the grid arrays 15 or 16 in that it is received in flat form by a mold 26 consisting of a plurality of rods and then moved by groupwise relative movement of the rods into the wave-form and fixed in place there. As shown by FIG. 18 the grid arrays 15', 16' are then placed on this wave-shaped grid array 25 and connected therewith by material bonding. Again, this can be accomplished by thermal action or by the application of an adhesive agent, an adhesive emulsion or the like.

The grid assembly 25 comprises fiber strands 27, these preferably extending along the first fiber strands 17, and fiber strands 28, these preferably extending parallel to the second fiber strands 18.

The two embodiments of the fiber reinforcement structures 12, 12' have in common that a first fiber strand 17 in a grid structure 15 or 15' is associated with another fiber strand 17, that is associated with another grid array 16 or 16, wherein the first fiber strand 17 of the one grid array 15 and the additional fiber strand 17 of the other grid array 16 are connected to each other. The connection may be continuous among the fiber strands 17 at points 21, 22 along the entire length or along partial lengths (FIG. 2 and FIG. 3), or said connection may be given only via the first fiber strands 18 (FIG. 1), or said connection may be mediated by the spacer array 24 (FIGS. 16 to 18). Preferably, a planar reinforcement according to FIGS. 1 to 9 is configured, in the first direction (x) and/or in the second direction (y), as a double rod like the double rod 19 according to FIG. 5, 7 or 9. This also applies to the grid arrays 15', 16' of FIG. 16.

The presented fiber reinforcement structure 12 or 12' can be used for the production of reinforcement bodies that are used—similar to construction steel mats—in concrete. In on-site concrete construction, the fiber reinforcement structures 12' can be walked on, in particular, and display a bearing capability at least as good as steel reinforcements when the first fiber strands 18 and/or the second fiber strands 17 are configured as double rods or multiple rods, with or without material bonding between the partial cross-sections.

The inventive method of providing a fiber reinforcement structure can be summarized by the following steps:

1. Providing fiber strands impregnated with plastic material;
2. Arranging a portion of the fiber strands as the first fiber strands (17) in an x-direction;
3. Arranging another portion the fiber strands in a y-direction, obliquely or transversely to the first fiber strands (17), on said first fiber strands in order to form a planar grid structure (15) by superimposed cross-plying or by producing a woven structure;
4. Partially curing the plastic impregnation to form a rigid, handleable grid structure (15, 15'), wherein partial curing can be accomplished by air-curing, air-drying or the like;
5. Producing additional grid structures (16, 16') by following the aforementioned steps;
6. Superposing or stacking at least two such grid structures (15, 16, 15', 16');
7. Aligning the grid structures (15, 16, 15', 16') relative to each other;

8. Preferably, material-bonded connection of the grid structures (15, 16, 15', 16') to each other.

The steps hereinabove describe the formation of a reinforcement grid according to the invention with the use of two individual grids. An alternative is the direct formation of such a grid by using double rods or multiple rods. In each case, a characteristic feature of such double rods or multiple rods is a cross-section that deviates from the circular form but is free of unrounded edges.

FIG. 19 shows a further three-dimensional reinforcement structure 12'. Similar to the reinforcement structure of FIGS. 16 and 17, this may again comprise two grid arrays 15', 16', one of which comprising, in at least one direction (x or y), reinforcement rods configured as a double rod array as in one of the aforementioned modifications. Interposed between two grid arrays 15', 16', there is provided a spacer that—as mentioned hereinabove—may be represented by a grid array 25. This grid array is preferably gently wave-shaped, so that sections 27 extending between the grid arrays 15', 16' have an approximately S-shaped curvature.

Alternatively or additionally, for example, spacers 28 made of injection-molded plastic parts may be provided, said spacers maintaining the two grid arrays 15', 16' at a distance from each other. The spacers 28 may be connected to the grid arrays 15', 16' or may also simply be placed between them.

There may be a further grid array 16", said grid array being connected to the grid array 16' via spacers 29, for example.

FIGS. 20 to 26 show additional reinforcement grid arrays with vertical or horizontally arranged double rod arrays. FIG. 20 shows a grid array 15 that has a three-dimensional form. The first fiber strands 17a, 17b form a double rod array. Interposed between them is the double rod array formed by the fiber strands 18a, 18b.

FIG. 21 shows that such a grid array 15 can be combined with an appropriately designed grid array 16, between which, in turn, suitable spacers are arranged. The spacers may again be single or double reinforcement rods, spacers (such as 28 or 29 in FIG. 19), or the like.

Due to the only minimal required concrete cover and the good deformability of the not yet fully cured, initially thermoplastic state of the plastic portions of the fiber strands, it is possible to fashion elegant three-dimensional shapes.

FIGS. 22 to 25 illustrate spatially closed forms of grid arrays as they can be found in concrete beams, concrete columns or the like, for example. As is obvious, they may follow circular shapes, rectangular shapes or other shapes. In the space between the inner and outer layers that are formed here by the fiber strands 17a, 17b, the fiber arrays 18a, 18b are arranged as a vertical or a horizontal double rod. FIGS. 24 and 25 illustrate that two or more such structures, respectively, can form a spatially expanded reinforcement structure in radial direction by means of spacers 30. The spacers 30 may be configured appropriate for any of the types of structures described above.

FIG. 26 illustrates the use of double rod grid arrays in the above-described pattern as the corner reinforcement part 31 It comprises two or more grids arrays 15, 16 that have been imparted with an appropriate preliminary form, for example an angular form in this case. Each of the grid arrays 15, 16 may have a structure corresponding to each of the aforementioned structures explained in conjunction with FIGS. 2 to 9 and FIG. 10 to 15, or use the double rod cross-sections explained there. In the corner region, the connection between the two grid arrays 15, 16 can be attained by an additional grid layer 32.

Figure 5:
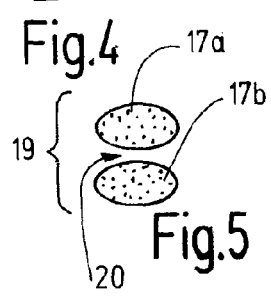
Figure 9:
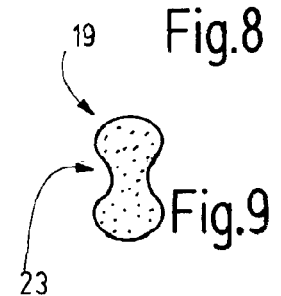

An inventive concrete component has a fiber reinforcement structure 12 that is represented by a grid array 15. Preferably, at least a few of the rods extending in x-direction or y-direction are configured as double rods having a continuous cross-section as shown by FIG. 7 or 9 or having partial cross-sections separated by a gap 20 as shown by FIG. 5. Such double rods may extend at a right angle to each other or also at different angles, such angles being, e.g., acute angles, in order to form a triangular structure, a hexagonal structure or the like, in order to provide a grid in a grid structure.

Fiber reinforcement structures 12 of this type consisting of fiber material impregnated with plastic, e.g., epoxide resin-bound glass fibers with long fibers (continuous fibers), in the respective longitudinal rod direction and without binding them together (rovings), can constitute in this way, on the one hand, a sufficient load-bearing bond with the concrete body 11 and thus have the steel rods act as armor or reinforcement, whereby, on the other hand, damaging actions on the concrete, in particular wedge and splitting actions, do not occur.

LIST OF REFERENCE SIGNS 10, 10' Concrete component
11, 11' Concrete body
12, 12' Fiber reinforcement structure
13, 14 Exterior faces
15, 16 Grid arrays 15', 16', 16"
17 First fiber strands
18 Second fiber strands
19 Double rod
20 Gap
21, 22 Sections
21, 22 Waist
23 Spacer array
24 Grid array
25 Form
26 Sections
28, 29, 30 Spacer
31 Corner reinforcement part
32 Grid layer

The invention claimed is:
1. Concrete component comprising:
a fiber reinforcement structure (12, 12') with a plurality of first fiber strands (17a) arranged in a first direction (x) and a plurality of second fiber strands (18a) arranged in a second direction (y), said fiber strands forming a first grid array (15, 15') with intersection points at which the first fiber strands (17a) and the second fiber strands (18) are connected to each other,
wherein each of the first fiber strands (17a) and the second fiber strands (18a) have a plastic portion;
additional fiber strands (17b, 18b, 27, 28) having a plastic portion, wherein the additional fiber strands (17b, 18b, 27, 28) are connected, at least in sections, to individual ones of the first fiber strands (17a) and/or to the second fiber strands (18a), respectively; and
a mineral body (11) which consists of a filler and of a binder, and in which the fiber reinforcement structure (12) is embedded;
wherein the additional fiber strands (17b, 18b, 27, 28) are connected to the first fiber strands (17a) and/or to the second fiber strands (18) in longitudinal direction, continuously or with gaps (20) in sections.

2. Concrete component as in claim 1, wherein the additional fiber strands (17b, 18b, 27, 28) are arranged parallel to the first fiber strands (17a) and/or to the second fiber strands (18).

3. Concrete component as in claim 1, wherein the first fiber strands (17a) and/or the second fiber strands (18a) define, with the additional fiber strands (17b, 18b), a cohesive cross-section or a double cross-section that, in a center section, defines a waist (23) or a passage (20).

4. Concrete component as in claim 1 further comprising,
a second grid array (16, 16') associated with the fiber reinforcement structure (12, 12'), said second grid array being firmly connected to the first grid array (15, 15').

5. Concrete component as in claim 4, wherein the first grid array (15, 15') and the second grid array (16, 16') have same mesh widths and are oriented so as to be in alignment with each other.

6. Concrete component as in claim 5, wherein the first grid array (15, 15') and the second grid array (16, 16') are connected superimposed in a material-bonded manner.

7. Concrete component as in claim 4, wherein the first grid array (15, 15') and the second grid array (16, 16') have same or different mesh widths.

8. Concrete component as in claim 4, further comprising a spacer grid (25) arranged between the first grid array (15') and the second grid array (16').

9. Concrete component as in claim 8, wherein the two grid arrays (15', 16') are connected to each other in a material-bonded manner by the spacer grid (25).

10. Concrete component as in claim 1, wherein the crossing points of the additional fiber strands (17b, 18b) define a plane (E2) at a distance from a plane (E1) that is defined by the intersection points of the first fiber strands (17a) and the second fiber strands (18a).

* * * * *